US012191043B2

(12) United States Patent
Lo

(10) Patent No.: US 12,191,043 B2
(45) **Date of Patent: *Jan. 7, 2025**

(54) STRUCTURED PLASMA CELL ENERGY CONVERTER FOR A NUCLEAR REACTOR

(71) Applicant: Austin Lo, Traverse City, MI (US)

(72) Inventor: Austin Lo, Traverse City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,554

(22) Filed: Nov. 1, 2023

(65) Prior Publication Data

US 2024/0062921 A1 Feb. 22, 2024

Related U.S. Application Data

(60) Continuation of application No. 17/870,957, filed on Jul. 22, 2022, now Pat. No. 11,842,820, which is a division of application No. 17/202,952, filed on Mar. 16, 2021, now Pat. No. 11,450,443.

(51) Int. Cl.
*G21C 3/40* (2006.01)
*G21D 7/04* (2006.01)
*H01J 45/00* (2006.01)

(52) U.S. Cl.
CPC ................ *G21C 3/40* (2013.01); *G21D 7/04* (2013.01); *H01J 45/00* (2013.01)

(58) Field of Classification Search
CPC .. H01J 45/00; G21C 3/40; G21D 7/04; G21H 1/106
See application file for complete search history.

(56) References Cited

U.S. PATENT DOCUMENTS

| | | | |
|---|---|---|---|
| 3,022,240 | A | 2/1962 | Bassett |
| 3,147,191 | A | 9/1964 | Crowther |
| 3,228,849 | A | 1/1966 | Fellows |
| 3,480,803 | A | 11/1969 | Jamerson et al. |
| 3,578,992 | A | 5/1971 | Shimada |
| 3,660,230 | A | 5/1972 | Bailey, Jr. et al. |
| 3,672,642 | A | 6/1972 | Beisswenger |
| 3,983,423 | A | 9/1976 | Rasor et al. |
| 4,367,196 | A | 1/1983 | Wende et al. |

(Continued)

FOREIGN PATENT DOCUMENTS

| | | | |
|---|---|---|---|
| AU | 254709 | B | 1/1964 |
| GB | 817754 | A | 8/1959 |

(Continued)

OTHER PUBLICATIONS

Korean Intellectual Property Office, International Search Report and Written Opinion for PCT/US2022/016057, mailed Jun. 9, 2022.

(Continued)

*Primary Examiner* — Brook Kebede
(74) *Attorney, Agent, or Firm* — Miller Johnson

(57) ABSTRACT

A structured plasma cell includes a first electrode including a first plurality of micro-cavities and a first plasma disposed within one or more micro-cavities of the first plurality of micro-cavities. The structured plasma cell also includes a second electrode including a second plurality of micro-cavities and a second plasma disposed within one or more micro-cavities of the second plurality of micro-cavities. The structured plasma cell also includes an inter-electrode gap disposed between the first electrode and the second electrode.

20 Claims, 5 Drawing Sheets

(56) References Cited

U.S. PATENT DOCUMENTS

| | | | |
|---|---|---|---|
| 6,489,704 B1 | 12/2002 | Kucherov et al. | |
| 9,190,177 B2 | 11/2015 | Ahlfeld et al. | |
| 10,163,537 B2 | 12/2018 | Hamilton | |
| 11,450,443 B1 * | 9/2022 | Lo | G21C 3/40 |
| 11,842,820 B2 * | 12/2023 | Lo | G21H 1/106 |
| 2006/0150611 A1 | 7/2006 | Allen | |
| 2007/0148522 A1 | 6/2007 | Cordelle et al. | |
| 2008/0057370 A1 | 3/2008 | Lee | |
| 2009/0130016 A1 | 5/2009 | Mills | |
| 2013/0059226 A1 | 3/2013 | Gomi et al. | |
| 2014/0116490 A1 | 5/2014 | Morgan | |
| 2017/0133956 A1 | 5/2017 | Landa et al. | |
| 2019/0027347 A1 | 1/2019 | Schwede et al. | |
| 2019/0237313 A1 | 8/2019 | Davidson et al. | |
| 2019/0371582 A1 | 12/2019 | Clark et al. | |
| 2020/0274045 A1 | 8/2020 | Birmingham | |
| 2020/0274046 A1 | 8/2020 | Birmingham | |

FOREIGN PATENT DOCUMENTS

| | | | | |
|---|---|---|---|---|
| GB | 847902 A | 9/1960 | | |
| GB | 850876 A | 10/1960 | | |
| GB | 905559 A | 9/1962 | | |
| GB | 1018828 A | 2/1966 | | |
| JP | 2008198469 A | 8/2008 | | |
| JP | 2020522681 A | 7/2020 | | |
| KR | 1215115 B1 | 12/2012 | | |
| WO | 2018204470 A1 | 11/2018 | | |
| WO | WO-2018208862 A1 * | 11/2018 | | G21B 3/006 |

OTHER PUBLICATIONS

USPTO, Non-Final Office Action for U.S. Appl. No. 17/202,952, mailed Apr. 28, 2022.

Dwyer, "Spectral structure of electron antineutrinos from nuclear reactors," Physical review letters, , p. 114, No. 1, 2015: 012502 (Year 2015).

Kopeikin, "Inverse beta decay in nonequilibrium antineutrino flux from a nuclear reactor," Physics of Atomic Nuclei 64, No. 5, 2001, pp. 849-854, (Year 2001).

Huber, "Determination of antineutrino spectra from nuclear reactors," Physical Review C 84, No. 2, 2011, 024617, (Year 2011).

Algora, "Total absorption study of beta decays relevant for nuclear applications and nuclear structure," Nuclear Data Sheets 120, 2014, pp. 12-15, (Year 2014).

Austin Lo, "Fission plasmas and their novel application to power producing nuclear reactors in space," UC Berkeley. ProQuest ID: Lo_berkeley_0028E_20111. Merritt ID: ark:/13030/m5102tnw. Retrieved from https://escholarship.org/uc/item/1x52n1gw, 117 pages.

Paramonov, Dmitry V., and Mohamed S. El-Genk. "A review of cesium thermionic converters with developed emitter surfaces." Energy conversion and management 38.6 (1997): 533-549.

EP Search Report for EP22771896.2 dated Jun. 3, 2024, 17 pages.

Japanese Office Action for JP2023-555546 dated Feb. 16, 2024, 7 pages.

* cited by examiner

STRUCTURED PLASMA CELL ENERGY CONVERTER FOR A NUCLEAR REACTOR

CROSS REFERENCE TO RELATED APPLICATION

This application is a continuation of U.S. application Ser. No. 17/870,957, filed on Jul. 22, 2022, which is a divisional of U.S. application Ser. No. 17/202,952, filed on Mar. 16, 2021. The entire disclosures of the above applications are incorporated herein by reference.

FIELD

The present disclosure relates generally to a structured plasma cell energy converter for a nuclear reactor.

BACKGROUND

This section provides background information related to the present disclosure and is not necessarily prior art.

Thermionic Energy Conversion (TEC) systems provide a direct heat to electric energy conversion by generating electricity from thermionic emission. TEC systems provide a benefit over traditional power plants because the TEC system eliminates the dynamic heat to electric energy conversion methods. In particular, TEC systems use heat to emit electrons from an electron-emitting material in order to produce electric energy. In some instances, the amount of heat applied to the electron-emitting material is directly proportional to the amount of electric energy the TEC system generates. However, the amount of heat required to generate electric energy in the TEC system is a potential limiting factor. Increasing the amount of electric energy output that is independent of the amount of heat applied to the system may allow for broader application of TEC systems for electrical energy production.

SUMMARY

This section provides a general summary of the disclosure, and is not a comprehensive disclosure of its full scope or all of its features.

One aspect of the disclosure provides a structured plasma cell energy converter for a nuclear reactor. The structured plasma cell includes a first electrode including a first plurality of micro-cavities and a first plasma disposed within one or more micro-cavities of the first plurality of micro-cavities. The structured plasma cell also includes a second electrode including a second plurality of micro-cavities and a second plasma disposed within one or more micro-cavities of the second plurality of micro-cavities. The structured plasma cell also includes an inter-electrode gap disposed between the first electrode and the second electrode.

Implementations of this aspect of the disclosure may include one or more of the following optional features. In some examples, the structured plasma cell further includes a bulk plasma disposed within the inter-electrode gap. In other examples, the structured plasma cell further includes an insulator disposed within the inter-electrode gap. Here, the insulator may include conductive paths configured to electrically connect one or more of the first plurality of micro-cavities with one or more of the second plurality of micro-cavities. Optionally, plasma may be disposed within the conductive paths of the insulator.

In some implementations, the first plurality of micro-cavities of the first electrode are disposed one a surface and a body of the first electrode. In these implementations, the first plurality of micro-cavities disposed on the surface of the first electrode are directly exposed to the inter-electrode gap. A quantity of the first plurality of micro-cavities may be less than a quantity of the second plurality of micro-cavities. In some examples, the first electrode includes a plurality of channels configured to electrically connect a first micro-cavity of the first plurality of micro-cavities with a second micro-cavity of the second plurality of micro-cavities. The first plasma may include a sheath surrounding the first plasma.

Another aspect of the disclosure provides a method of operating a structured plasma cell to produce electricity. The structured plasma cell includes a first electrode including a first surface and a first plasma, the first surface defining a first micro-cavity and the first plasma disposed within the first micro-cavity. The structured plasma cell also includes a second electrode including a second surface and a second plasma, the second surface defining a second micro-cavity and the second plasma disposed within the second micro-cavity. The method includes generating, by an electromagnetic (EM) source, and EM field and propagating the EM field in a direction parallel to the second surface. The method also includes increasing, by the EM field, a temperature of electrons disposed within the second plasma.

This aspect may include one or more of the following optional features. In some implementations, the first surface includes a conductive material. In some examples, the method further includes absorbing the EM field into the second plasma. In these examples, the method further includes ionizing the first plasma using charged particles from a nuclear reaction, emitting electrons from the first surface of the first electrode into the first plasma disposed within the first plurality of micro-cavities, conducting the emitted electrons from the first plurality of micro-cavities through an inter-electrode gap to the second plurality of micro-cavities, and collecting the emitted electrons at the second surface of the second electrode.

The method may further include providing an insulator at an inter-electrode gap disposed between the first electrode and the second electrode. Optionally, the EM field may include one of a radiofrequency wave or a microwave. In some examples, the first electrode includes a dielectric material. In some implementations, the first electrode includes a first body that is concealed from the first plasma. The increased temperature of the electrons in the second plasma may increase an amount of electricity produced by the structured plasma cell. In some examples, the first plurality of micro-cavities is less than the second plurality of micro-cavities.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Figure 1A:
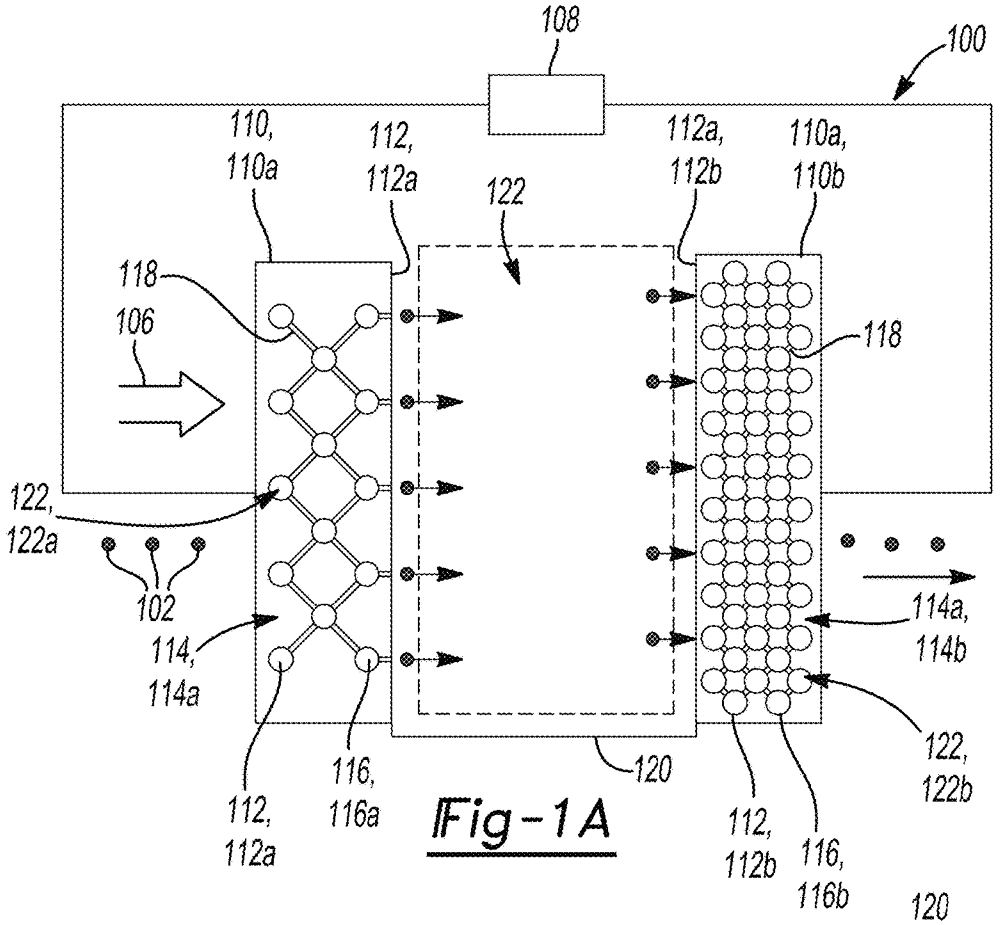
FIG. 1A is a functional block diagram of an exemplary structured plasma cell energy converter for a nuclear reactor, according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Thermionic energy conversion (TEC) is a direct heat to electric energy conversion process which generates electricity from thermionic emission. In particular, TEC systems produce electricity by emitting electrons from a first electrode (i.e., emitter or cathode) that are collected at a second electrode (i.e., collector or anode). The space or gap disposed between the emitter and collector is referred to as an inter-electrode gap. As electrons emit from the emitter, the electrons collect in the inter-electrode gap creating the space charge effect. The space charge effect refers to the collection of negative charge from electrons near the surface of an electrode. That is, as the electrons collect in the inter-electrode gap and/or near the surface of the electrode, the negative charge of the electrons repel further emission of electrons. The space charge effect repels additional electrons from emitting from the emitter, thus, preventing additional electrons from travelling from the emitter to the collector.

Current implementations of TEC systems utilize a conductive medium in the inter-electrode gap to mitigate the space charge effect. In some examples, TEC devices include a conductive gas (i.e., a bulk plasma) in the inter-electrode gap. The bulk plasma in the inter-electrode gap mitigates the space charge effect by conducting the electrons across the inter-electrode gap. That is, the bulk plasma (e.g., cesium) is a conductive gas that conducts the electrons that emit from the emitter, through the conductive bulk plasma, to the collector. The bulk plasma facilitates the electrons travelling from the emitter through the inter-electrode gap to the collector such that the electrons do not collect in the inter-electrode gap creating the space charge effect. That is, without a conductive medium (e.g., bulk plasma) in the inter-electrode gap, the electrons are unable to conduct across the inter-electrode gap and instead collect at or near the surface of the emitter. Thus, the bulk plasma by conducting electrons through the inter-electrode gap mitigates the space charge effect.

However, in some implementations, the bulk plasma in the inter-electrode gap may not conduct electrons in a natural, pre-ionized state. Once the plasma ionizes, the plasma may conduct electrons from the emitter to the collector. In some examples, the bulk plasma may be ionized by coming into contact with the emitter, allowing the emitter to transmit electrons across the plasma. The plasma may be ionized by electrons emitted from the emitter such that the emitted electrons both ionize the plasma and traverse the inter-electrode gap.

In other examples, the plasma is a diffusion-dominated plasma that ionizes from charged particles striking a neutral atom of the plasma and ionizing the neutral atom into an additional electron and an ion, also referred to as charged particle ionization. Here, charged particles may include fission fragments, alpha decay particles, and/or beta decay particles. In particular, TEC systems may include a neutron source that produces neutrons that are absorbed by a net neutron-producing material. The net neutron-producing material can either be fissile (e.g., U-235)—that is, capable of a fission reaction after absorbing a neutron—or fertile (e.g., U-238)—that is, not capable of undergoing a fission reaction after absorbing a neutron. After absorbing the neutron, the net neutron-producing material becomes unstable splitting into fission fragments. In some implementations, the fission fragments undergo beta decay such that a fission fragment converts one of its neutrons into a proton by releasing an additional electron referred to herein as a "beta decay particle." The fission fragments and/or beta decay particles (collectively referred to as charged particles) generated by a nuclear reaction (e.g., fission and/or beta decay) may ionize the plasma of the TEC system. Thus, the charged particles (e.g., fission fragments and/or beta decay particle) ionize the plasma and the electrons emitted from the emitter traverse the inter-electrode gap to the collector to produce electricity.

The quantity of electrons that emit from the emitter to the collector represents the current density of the TEC system. That is, the higher the current density of the TEC system the greater amount of electricity the TEC system generates. The current density output of the TEC system is dependent on a surface area ratio between the electrodes (e.g., emitter and collector) and the plasma. In particular, an increased surface area between the emitter and the plasma increases the quantity of electrons that emit from the emitter into the plasma. An increased surface area between the collector and the plasma increases the quantity of electrons that collect at the collector to produce the electric current.

Implementations herein are directed toward a structured plasma cell energy converter for a nuclear reactor. The structured plasma cell includes electrodes (e.g., emitter and collector) that include a plurality of micro-cavities. The micro-cavities are configured to increase the surface area of the electrodes. Thus, the micro-cavities, by increasing the surface area of the electrodes, increases the surface area ratio between the plasma and the electrodes. In some examples, the increased surface area ratio between the plasma and the electrodes increases the amount of electricity produced by the TEC system. In other examples, the increased surface area ratio between the plasma and the electrodes allows the TEC system to operate at a lower temperature while the current output of the TEC system remains the same.

Referring now to FIG. 1A, in some examples, a structured plasma energy cell system 100 (interchangeably referred to as TEC system 100) includes electrodes 110, an inter-electrode gap 120, a heat source 106, and a load 108. The electrodes 110 may include an emitter 110*a* and a collector 110*b*. The emitter 110*a* is configured to emit electrons 102 through the inter-electrode gap 120 to the collector 110*b*. That is, as the emitter 110*a* is heated by the heat source 106, the electrons 102 boil off the emitter 110*a* into the inter-electrode gap 120. The heat source 106 used to heat the emitter 110*a* may be any external heat source 106. In some examples, the heat source 106 generates heat from a nuclear reaction (e.g., fission and/or fusion). The collector 130 is configured to collect the electrons 102 that traverse the inter-electrode gap 120 from the emitter 110*a*. The electrons 102 collected by the collector 110*b* create an electric current that drives the load 108. The quantity of electrons 102 that traverse the inter-electrode gap 120 and drive the load 108 represents the amount of electricity produced by the structured plasma energy cell system 100.

In some implementations, the inter-electrode gap 120 includes a bulk plasma 122 referred to herein as plasma 122. The plasma 122, disposed within the inter-electrode gap 120, is configured to mitigate space charge. In particular, the plasma 122 may include a conductive gas (i.e., cesium) that conducts electrons 102 emitted from the emitter 110*a* through the inter-electrode gap 120 to the collector 110*b*. By conducting electrons 102 across the inter-electrode gap 120, the plasma 122 reduces the quantity of electrons 102 that collect at and/or near the emitter 110*a* thereby reducing the space charge effect. The plasma 122 may also include a sheath (not shown) that surrounds the conductive material of the plasma 122. The sheath may include a positively charged ion density that is greater than the electron density in the sheath. The greater density of positively charged ions in the sheath happens because the weight of the electron is less than the weight of the ion. The lower weight of the electron allows the electron to be more mobile than the ion, thus, the electrons escape the TEC system 100 (e.g., producing a current output) at a rate that is higher than the rate of ions escaping the TEC system 100.

The electrodes 110 may include an electrode surface 112 and an electrode body 114. In particular, the emitter 110*a* includes an emitter surface 112*a* and an emitter body 114*a*. The emitter surface 112*a* is directly exposed to the plasma 122 such that electrons 102 emit from the emitter surface 112*a* into the plasma 122. In some examples, the emitter surface 112*a* is directly exposed to the plasma 122 disposed within the inter-electrode gap 120. In other examples, the emitter surface 112*a* is directly exposed to the plasma 122 disposed outside of the inter-electrode gap 120. The emitter body 114*a* is surrounded by the emitter surface 112*a* such that the emitter body 114*a* is concealed from direct exposure of the plasma 122 disposed either within or outside of the inter-electrode gap 120.

The collector 110*b* may include a collector surface 112*b* and a collector body 114*b*. The collector surface 112*b* is directly exposed to the plasma 122 disposed within the inter-electrode gap 120 such that electrons 102 that traverse the plasma 122 through the inter-electrode gap 120 collect at the collector surface 112*b*. In some examples, the collector surface 112*b* is directly exposed to plasma 122 disposed within the inter-electrode gap 120. In other examples, the collector surface 112*b* is directly exposed to plasma 122 disposed outside of the inter-electrode gap 120. The collector body 114*b* is surrounded by the collector surface 112*b* such that the collector body 114*b* is concealed from direct exposure to the plasma 122 disposed either within or outside of the inter-electrode gap 120.

The output power or electricity of the TEC system 100 may be represented by:

$$P_{out}=IV_{out} \tag{1}$$

In equation (1), $P_{out}$ represents the output power or electricity produced by the TEC system 100, I represents the current of the TEC system 100, and $V_{out}$ represents the output voltage of the TEC system 100. The output voltage $V_{out}$ of the TEC system 100 may be represented by:

$$V_{out}=(\phi_E-\phi_C)+V_{p,bias} \tag{2}$$

In equation (2), $V_{out}$ represents the output voltage of the TEC system 100, $\phi_E$ represents the emitter 110*a* work function, $\phi_C$ represents the collector 110*b* work function, and $V_{p,bias}$ represents the bias voltage applied to the plasma 122 in the inter-electrode gap 120. $V_{p,bias}$ may be represented by:

$$V_{p,bias}=\begin{cases} T_e\ln\left[A\dfrac{(1+R/\mu-I/I_{th})}{(AR/\mu+I/I_{th})}\right], & V_E<V_p \\ T_E\ln\left(\dfrac{1+R/\mu}{R+I/I_{th}}\right)-T_e\ln\left(\dfrac{I/I_{th}+AR/\mu}{AR}\right), & V_E>V_p \end{cases} \tag{3}$$

In equation (3), A represents the ratio of the emitter surface area to the collector 110*b* to the emitter 110*a* surface area, R represents the ratio of plasma electron current to the thermionic current, μ represents the ratio of the plasma electron current to the ion current, $T_E$ represents the temperature of the emitter 110*a*, $T_e$ represents the temperature of the electrons, $I_{th}$ represents the thermionic emission current, $V_E$ represents the voltage potential at the emitter 110*a*, and $V_p$ represents the voltage potential of the plasma 122. Thus, equation 3 represents output voltage $V_{out}$ as a function of the current I in terms of the thermionic emission current $I_{th}$ and the surface areas of the emitter 110*a* and collector 110*b* A. The current I of the TEC system 100 and the thermionic emission current $I_{th}$ may be represented respectively by:

$$I=I_{th}+I_{e,E}\left(\frac{1}{\mu}-1\right) \tag{4}$$

$$I_{th}=A_E\frac{4\pi em_ek^2}{h^3}T_E^2\exp\left(-\frac{\phi_E}{kT_E}\right) \tag{5}$$

In equations (4) and (5), $A_E$ represents the surface area of the emitter 110*a*, $\phi_E$ represents the emitter 110*a* work function, $T_E$ represents the temperature of the emitter 110*a*, e represents electron 102 charge in coulombs, $m_e$ represents electron 102 mass in kilograms, k represents Boltzmann's constant in joules per kelvin, h represents Planck's constant in joule seconds, and $I_{e,E}$ represents the electron current at the emitter 110*a*.

In some implementations, increasing the surface area of the electrodes 110 increases the output power $P_{out}$ of the TEC system 100. In particular, as shown by equations (1), (4), and (5) above, increasing the surface area $A_E$ of the emitter 110*a* causes the thermionic emission current $I_{th}$ to also increase thereby increasing the power output of the TEC system 100. Increasing the surface area $A_E$ of the emitter 110*a* may also allow the temperature of the emitter $T_E$ to decrease while the thermionic emission current $I_{th}$ remains the same. That is, the increased surface area $A_E$ of the emitter 110*a* allows the TEC system 100 to operate at a lower temperature $T_E$ while the output power $P_{out}$ remains the same. Operating TEC systems 100 at lower temperatures $T_E$ increases the life expectancy of the TEC system 100.

In some implementations, the surface area of the electrodes 110 is increased by increasing the size of the electrodes 110 which increases the volume V of the TEC system 100. However, the TEC system 100 may include a volume V constraint that prevents increasing the size of the electrodes 110 in order to increase the surface area $A_E$. In other implementations, the surface area $A_E$ is increased by providing a plurality micro-cavities 116 at the electrodes 110. Specifically, the emitter 110*a* may include a first plurality of micro-cavities 116*a* and the collector 110*b* may include a second plurality of micro-cavities 116*b*. The micro-cavities 116 may be voids, dimples, pores, micro-structures, or other suitable constructs, included at the electrode surface 112 and/or the electrode body 114. The micro-cavities 116 may include any suitable geometric shape, size, quantity, and/or configuration or combination thereof that is dependent upon the particular TEC system 100 application. For example, an electrode 110 may include a spherical micro-cavity 116 with a surface area of 10 $mm^2$ per 1 $mm^3$ volume of the electrode 110. In some examples, the quantity of the first plurality of micro-cavities 116*a* is less than the quantity of the second plurality of micro-cavities 116*b* at the collector 110*b*. The micro-cavities 116 increase the surface area of the surface 112 of electrode 110 (e.g., surface area of the emitter $A_E$) while the volume V of the TEC system 100 remains the same.

In some examples, the micro-cavities 116 of the electrode 110 are disposed within the electrode body 114 such that the increased surface area of the electrode surface 112 is concealed from direct exposure to the plasma 122 disposed within the inter-electrode gap 120. In other examples, the micro-cavities 116 of the electrode 110 are disposed on the electrode surface 112 that is directly exposed to the inter-electrode gap 120. Here, the micro-cavities 116 disposed on the electrode surface 112 are also directly exposed to the plasma 122 disposed within the inter-electrode gap 120. The electrodes 110 may include any combination of micro-cavities 116 disposed on the electrode surface 112 and/or the electrode body 114.

The increased surface area of the electrode surface 112 created by the micro-cavities 116 may be configured to emit or collect electrons 102. For example, as the heat source 106 heats the emitter 110*a* the additional emitter surface 112*a* created by the micro-cavities 116 emits electrons 102 into the void created by the micro-cavities 116. The electrons 102 emitted from the emitter surface 112*a* into the micro-cavities 116 may collect at or near the emitter surface 112*a* creating the space charge effect at the micro-cavities 116. In some examples, the micro-cavities 116 of the electrodes 110 include plasma 122 configured to mitigate the space charge effect. In particular, a first plasma 122*a* may be disposed within each micro-cavity 116 disposed on the emitter 110*a* and a second plasma 122*b* may be disposed within each micro-cavity 116 disposed on the collector 110*b*. In some examples, the decreased surface area exposure between the emitter 110*a* and collector 110*b* surfaces creates reduced radiative losses improving the overall efficiency of the TEC system 100. The decreased surface area also significantly lowers the emission current I and $T_E$ required to offset radiative losses.

Figure 1B:
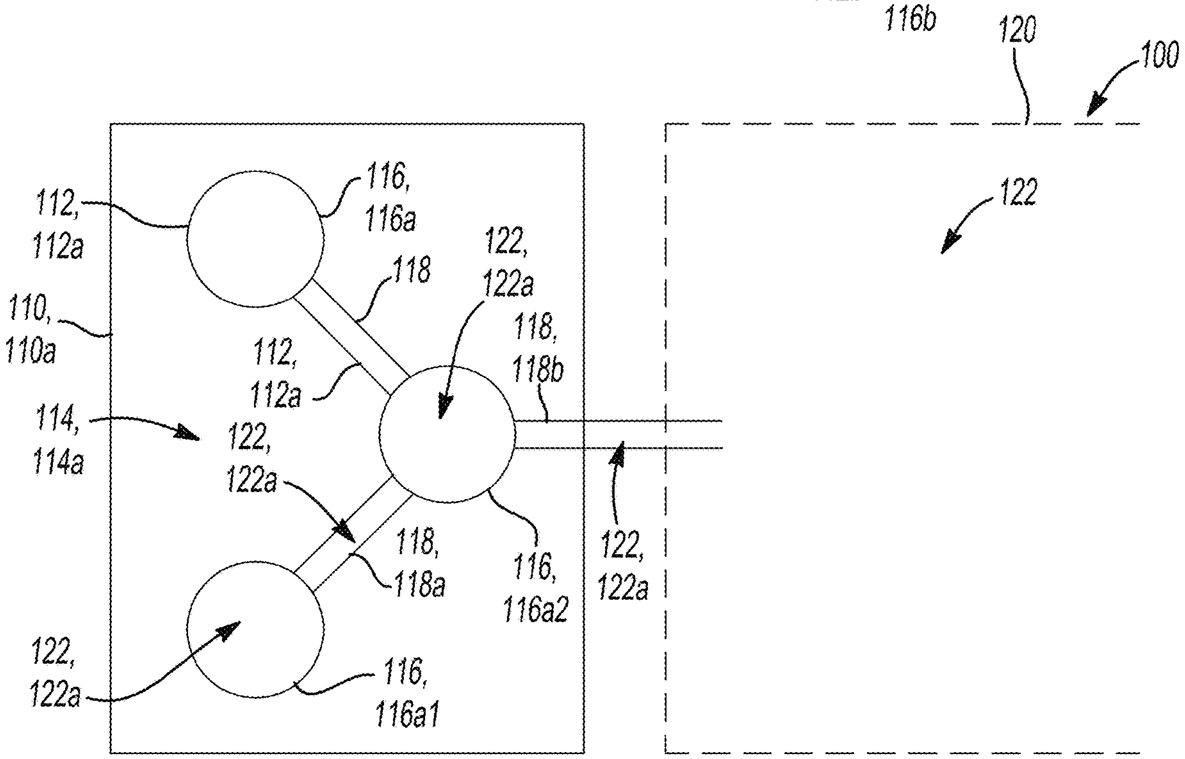
FIG. 1B is an exploded view of an electrode from the structured plasma cell energy converter of FIG. 1A, according to the principles of the present disclosure.

Referring now to FIG. 1B, in some implementations, the electrodes 110 (e.g., emitter 110*a* and collector 110*b*) include one or more channels 118. The one or more channels 118 are configured to connect, and allow for fluid communication between, the one or more micro-cavities 116 with one or more other micro-cavities 116 and/or the inter-electrode gap 120. The one or more channels 118 include plasma 122 that provides a conductive medium (e.g., cesium) to conduct electrons 102. The plasma 122 disposed within the channels 118 allows electrons 102 to conduct between micro-cavities 116 of the electrode 110. In some examples, the first plasma 122*a* is disposed within the channels 118 of the emitter 110*a*. In other examples, the second plasma 122*b* is disposed within the channels of the collector 110*b*. For example, FIG. 1B illustrates an exploded view of an emitter 110*a* from the TEC system 100 with multiple channels 118 electrically connecting the micro-cavities 116*a* to other micro-cavities 116*a* and/or the inter-electrode gap 120. For sake of clarity only the emitter 110*a* is illustrated in FIG. 1B, however, it is understood that an exploded view of the collector 110*b* is substantially similar to the exploded view of the emitter 110*a* in FIG. 1B. The emitter 110*a* includes a first channel 118*a* that connects a first micro-cavity 116*a*1 disposed within the emitter body 114*a* to a second micro-cavity 116*a*2 disposed within the emitter body 114*a*. The first channel 118*a* includes the first plasma 122*a* that conducts electrons 102 between the first micro-cavity 116*a*1 and the second micro-cavity 116*a*2. The first channel 118*a* may also be configure to emit electrons 102 directly from the emitter surface 112*a* into the first plasma 122*a* disposed within the first channel 118*a*.

In some examples, the one or more channels 118 electrically connect and/or allows for electrical communication from the one more micro-cavities 116*a* to the plasma 122 disposed within the inter-electrode gap 120. For example, as shown in FIG. 1B, a second channel 118*b* connects the second micro-cavity 116*a*2 to the inter-electrode gap 120. The second channel 118*b* connects the second micro-cavity 116*a*2 to the plasma 122 disposed within the inter-electrode gap 120. The second channel 118*b* allows electrons 102 conducting between the first micro-cavity 116*a*1 and second micro-cavity 116*a*2 to conduct into the inter-electrode gap 120. Thus, the second channel 118*b* allows electrons 102 from the first micro-cavity 116*a*1 and second micro-cavity 116*a*2 to conduct into the inter-electrode gap 120 and produce an electric current for the TEC system 100. The one or more channels 118 may electrically connect any number of micro-cavities 116*a* to any number of other micro-cavities 116*a* (e.g., micro-cavities 116 disposed on the emitter surface 112*a* and/or the emitter body 114*a*). The one or more channels 118 may also act as a micro-cavity 116 by emitting (e.g., from the emitter 110*a*) or collecting (e.g., at the collector 110*b*) electrons 102 from the electrode surface 112 directly from the plasma 122 disposed within the channel 118. Here, the electrons 102 may emit directly into the one or more channels 118 and conduct to one or more of the micro-cavities 116 or the inter-electrode gap 120.

In some implementations, as the heat source 106 heats the emitter 110*a* and electrons 102 emit from the emitter surface 112*a* the electrons 102 enter the plasma 122 disposed within the micro-cavities 116*a* of the emitter 110*a*. Here, the electrons 102 may conduct, via the one or more channels 118, to another micro-cavity 116*a* of the emitter 110*a* and/or to the plasma 122 disposed within the inter-electrode gap 120. Once the electron 102 reaches the plasma 122 disposed within the inter-electrode gap 120, the electron 102 conducts to a micro-cavity 116*b* disposed on the collector 110*b* via the one or more channels 118 of the collector 110*b*. In some examples, the electron 102 collects at the collector surface 112*b* and produces an electric current to drive the load 108.

Figure 2:
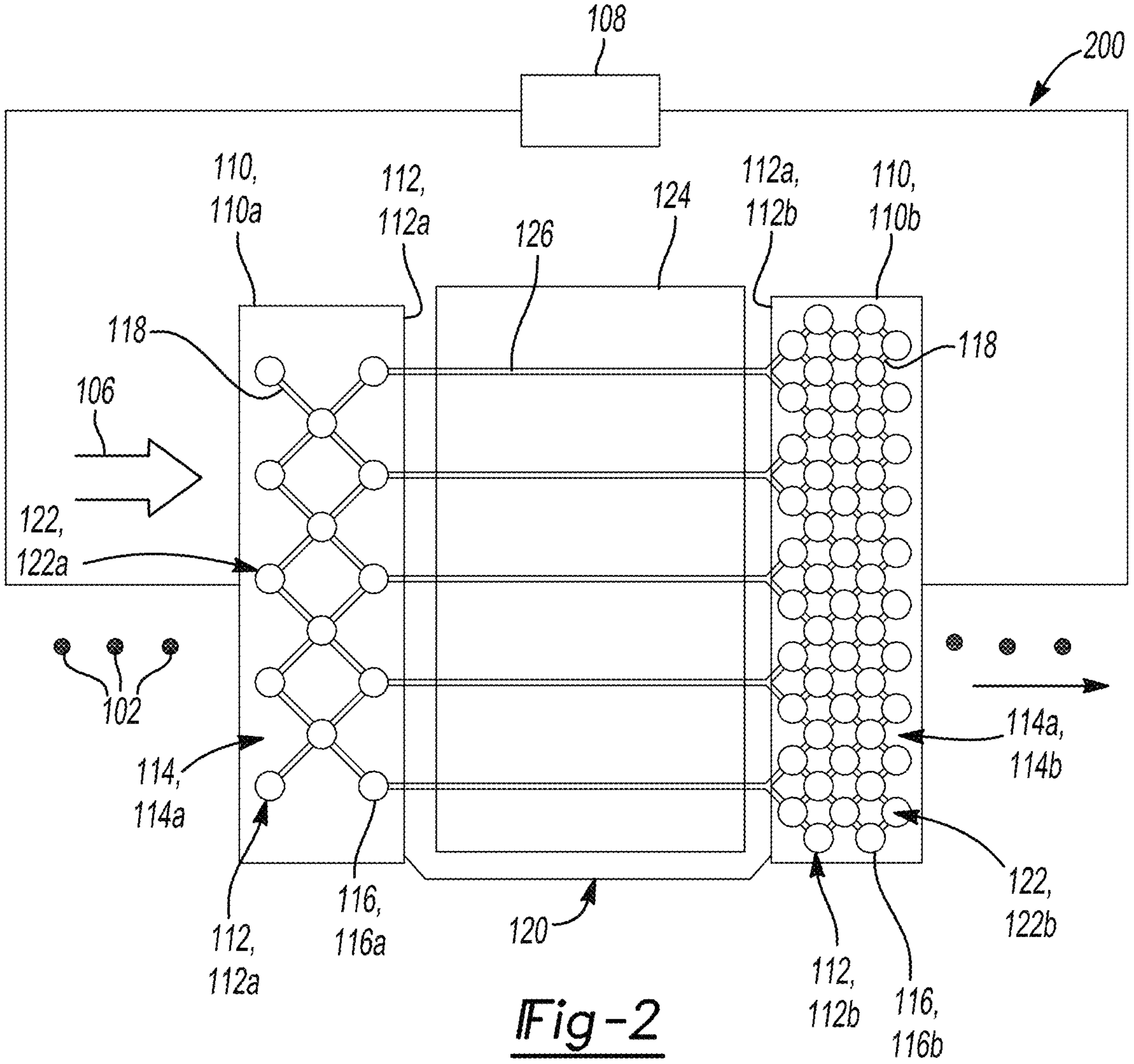
FIG. 2 is a functional block diagram of an exemplary structured plasma cell energy converter with an insulator, according to the principles of the present disclosure.

Referring now to FIG. 2 a structured plasma energy cell system 200 (interchangeably referred to as TEC system 200) may be substantially similar to the TEC system 100 except as described herein. The TEC system 200 includes the electrodes 110, the inter-electrode gap 120, the heat source 106, and the load 108. In some implementations, TEC system 200 includes an insulator 124 in the inter-electrode gap 120. The insulator 124 is configured to provide electrical isolation between the emitter 110*a* and the collector 110*b*. That is, the insulator 124 includes a non-conductive material that prevents electrons 102 from traversing from the emitter 110*a* to the collector 110*b*. The insulator 124 may also prevent an electrical short from occurring between the emitter 110*a* and the collector 110*b*. In some examples, the solid insulator 124 material (e.g., ceramic) provides structural support for the TEC system 200 in the inter-electrode gap 120.

In some implementations, the insulator 124 disposed within the inter-electrode gap includes conductive paths 126. The conductive paths 126 are configured to conduct electrons 102 from the emitter 110*a* to the collector 110*b* through the inter-electrode gap 120. Because the insulator prevents electrons 102 from conducting from the emitter 110*a* to the collector 110*b* the conductive paths 126 conduct electrons from the emitter 110*a* to the collector 110*b* to produce a current output and drive the load 108. The conductive paths 126 may include a conductive medium (e.g., plasma 122) that conducts the electrons 102 from the emitter 110*a* to the collector 110*b*.

Each conductive path 126 may connect one or more micro-cavities 116*a* of the emitter 110*a* to one or more micro-cavities 116*b* of the collector 110*b*. In some examples, the conductive path 126 connects a single micro-cavity 116*a* disposed on the emitter 110*a* to one or more micro-cavities 116*b* disposed on the collector 110*b*. In some implementations, as the heat source 106 heats the emitter 110*a* and electrons 102 emit from the emitter surface 112*a* the electrons 102 enter the first plasma 122*a* disposed within the micro-cavities 116*a* of the emitter 110*a*. Here, the electrons 102 may conduct, via the one or more channels 118, to another micro-cavity 116*a* of the emitter 110*a* and/or to the conductive paths 126 of the insulator 124. Once the electron 102 reaches the conductive path 126, the plasma 122 disposed within the conductive path 126 conducts the electron to one or more micro-cavities 116*b* disposed on the collector 110*b*. In some examples, the electron 102 collects at the collector surface 112*b* and produces an electric current to drive the load 108.

In some implementations, TEC devices utilize electromagnetic (EM) fields to ionize the plasma. However, current TEC devices (e.g., TEC devices that include electrodes without micro-cavities) use electrodes that have a conductive surface. The conductive surface of the electrodes shields the plasma by absorbing the EM field energy such that the plasma does not absorb any of the EM field energy. The conductive surface of the electrodes allows electrons to emit from the emitter and be absorbed by the collector. Some techniques attempt to reduce the thickness of the electrode material such that the conductive surface of the electrodes do not absorb all of the EM field energy and a portion of the EM field energy is absorbed by the plasma. However, these techniques reduce the overall life expectancy of the TEC devices because the thin electrode materials are unable to withstand the high operating temperature of the TEC device.

Implementations herein are directed towards a method of producing electricity with a TEC system with electrodes that include micro-cavities. These implementations include generating EM fields that propagate parallel to the conductive surfaces of the electrodes. The parallel propagation direction of the EM fields relative to the conductive surfaces of the electrodes allows the EM fields to propagate into the micro-cavities of the electrodes and absorb into the plasma disposed within the micro-cavities and channels of the electrodes. The absorption of the EM fields into the plasma ionizes and/or increases the temperature of electrons in the plasma thereby increasing the efficiency of the TEC system and ionizing the plasma.

Figure 3A:
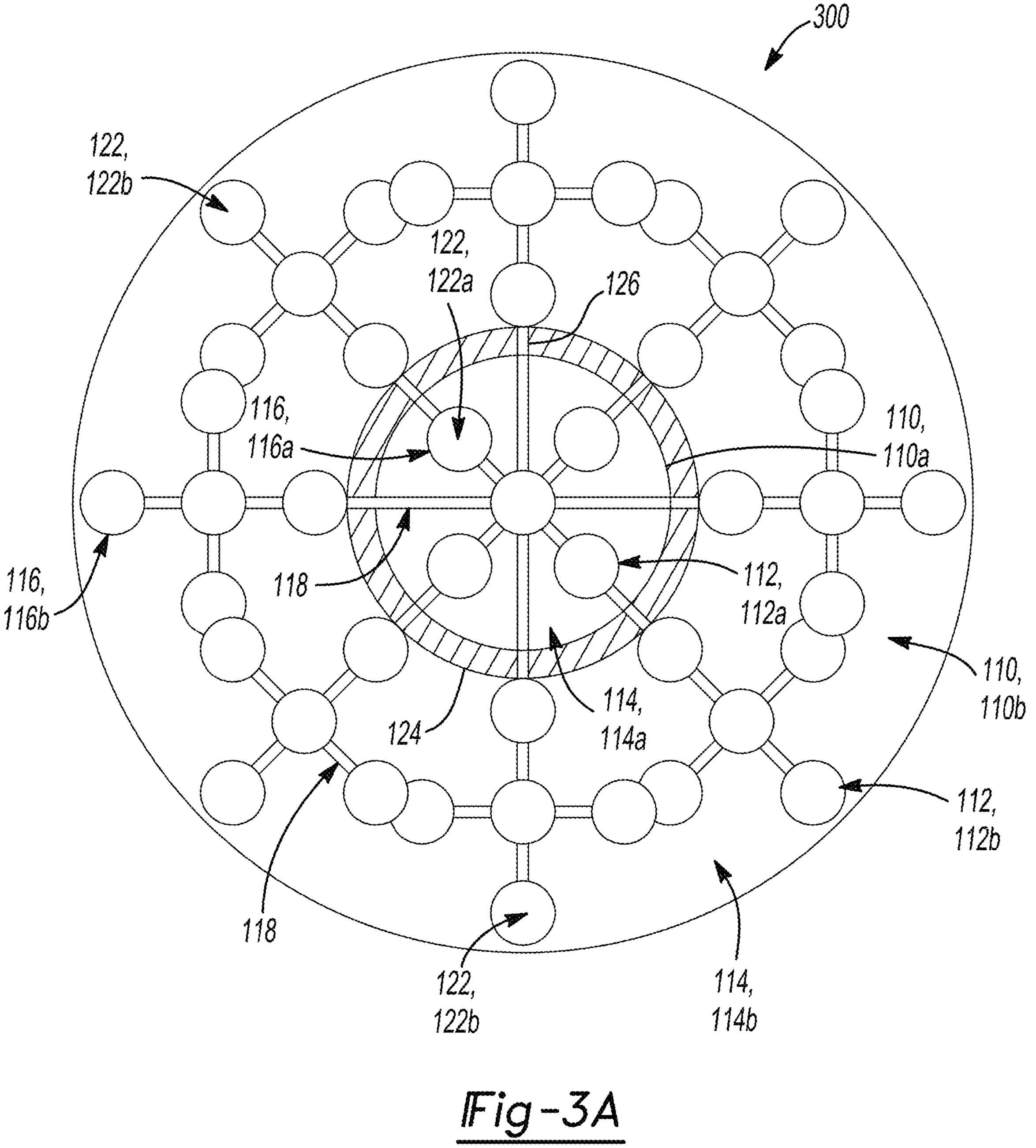
FIG. 3A is a schematic top view of an exemplary structured plasma cell energy converter arrangement, according to the principles of the present disclosure.

FIG. 3A illustrates a top view of a structured plasma energy cell system 300 (interchangeably referred to as TEC system 300). The TEC system 300 includes an emitter 110*a* that includes a first plurality of micro-cavities 116*a* that may be disposed on the emitter surface 112*a* or the emitter body 114*a*. The TEC system 300 also includes a collector 110*b* that includes a second plurality of micro-cavities 116*b* that may be disposed on the collector surface 112*b* or the collector body 114*b*. In some examples, the electrodes 110 (e.g., emitter 110*a* and collector 110*b*) include one or more channels 118 that include a first or second plasma 122*a*, 122*b* that electrically connects the one or more micro-cavities 116 to one or more different micro-cavities 116 of the electrode 110. In other examples, the channels 118 of the electrodes electrically connect the one or more micro-cavities 116 to a conductive path 126 of the insulator 124. The insulator 124 is disposed in the inter-electrode gap between the emitter 110*a* and the collector 110*b*. The insulator 124 includes one or more conductive paths 126 that include a plasma 122 disposed within the conductive path 126 that electrically connects the first plurality of micro-cavities 116*a* to the second plurality of micro-cavities 116*b*. As illustrated in FIG. 3A, the quantity of the second plurality of micro-cavities 116*b* is greater than the quantity of the first plurality of micro-cavities 116*a*.

Figure 3B:
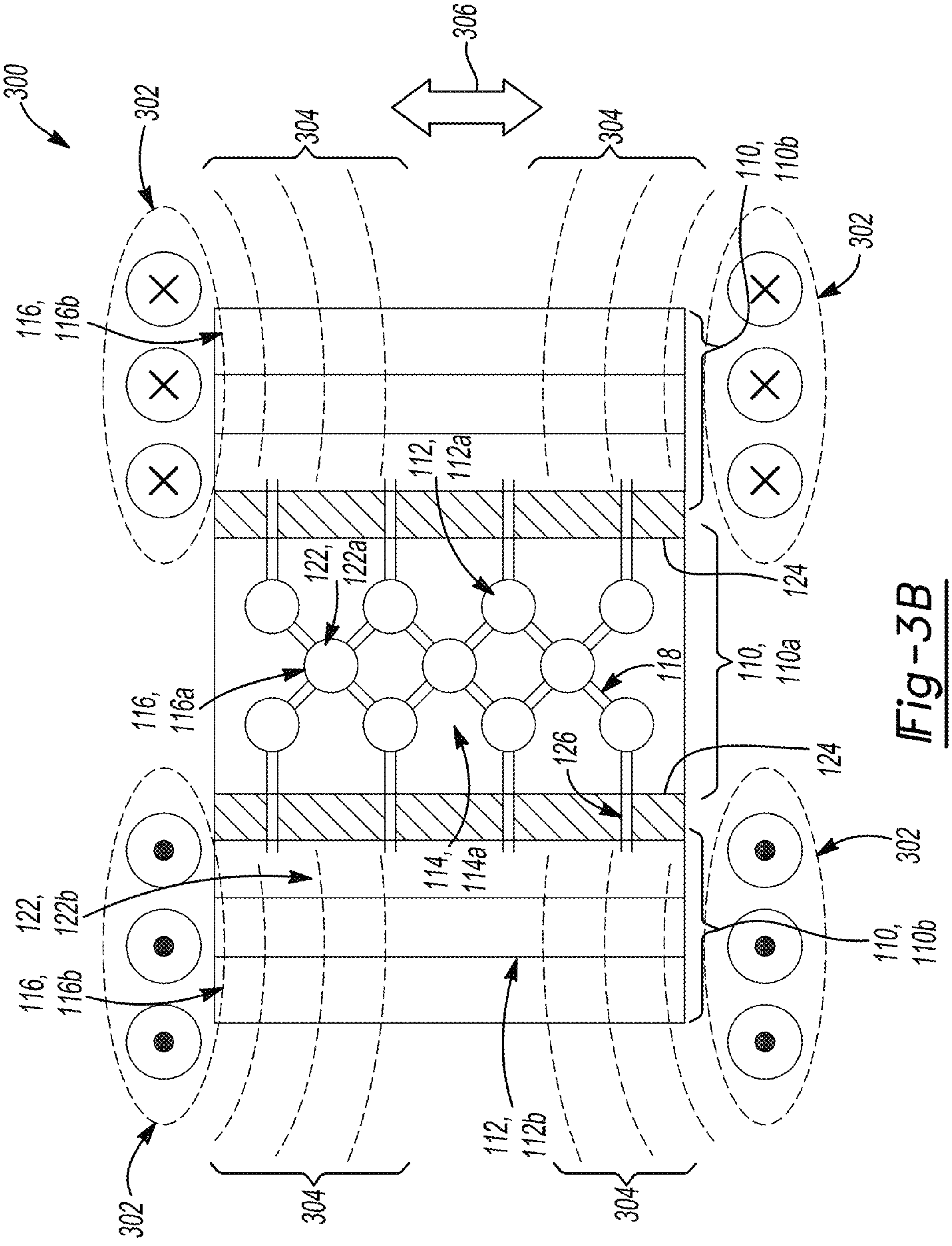
FIG. 3B is a schematic side view of the structure plasma cell energy converter of FIG. 3A operating using electromagnetic field ionization, according to the principles of the present disclosure.

FIG. 3B illustrates a side view of the structured energy cell system 300 of FIG. 3A using EM field ionization. In some implementations, the TEC system 300 generates electricity using one or more EM sources 302 to produce EM fields 304 for EM field ionization. Here, the EM sources 302 produce any type of EM field such as, for example, radiofrequency waves or microwaves. As the EM sources 302 generate EM fields 304, the EM fields 304 travel in a propagation direction 306. The propagation direction 306 of the EM fields travels parallel to conductive surfaces of the electrodes 110. The surface 112 of the electrodes 110 includes conductive material configured to emit and collect electrons 102 from the conduction band of the electrodes 110. That is, the conductive material at the surface 112 of the electrodes 110 allow electrons 102 to escape and collect at the surface 112 of the electrodes 110. Thus, the surface 112 may interchangeably be referred to as the conductive surface 112 herein. The conductive surface 112 may be disposed on the emitter surface 112*a*, the collector surface 112*b*, the one or more channels 118, and/or the one or more conductive paths 126. The body 114 of the electrodes 110 may include a dielectric material that help contain the electrons 102 within the electrode 110.

In some examples, the conductive surfaces 112 absorb the EM fields 304 and shield any of the EM fields 304 from absorbing into the plasma 122. However, generating the EM fields 304 in the propagation direction 306 that is parallel to the conductive surfaces 112 allows the EM fields 304 absorb into the plasma 122. Specifically, the micro-cavities 116 provide holes in which the EM fields 304 can penetrate. The channels 118 and conductive paths 126 that are connected to the micro-cavities 116 provide additional parallel conductive surfaces 112 that the EM fields 304 can propagate through. Thus, the micro-cavities 116, channels 118, and conductive paths 126 may each provide a parallel conductive surface 112 for the EM fields 304 to propagate through. As the EM fields 304 propagate through the parallel conductive surfaces 112 the EM fields 304 absorb into the plasma 122 disposed within the conductive surfaces 112. By absorbing into the plasma 122, the energy of the EM fields 304 ionize the plasma 122, referred to as EM field ionization. EM field ionization may be used additionally and/or alternatively to charged particle ionization to ionize the plasma 122. In some examples, as the EM fields 304 absorb into the plasma 122 the plasma ionizes. In other examples, the EM fields 304 may increase the temperature of the electrons 102 disposed within the plasma 122. That is, as the EM field 304 absorb into the plasma 122 the electrons 102 are excited (i.e., move) causing the electrons 102 to heat up. The increased temperature of the electrons 102 is directly proportional to the plasma voltage bias (e.g., $V_{p,bias}$ from equation 2). Thus, the increased temperature of the electrons 102 from the EM fields 304 absorbing into the plasma 122 may increase the plasma voltage bias $V_{p,bias}$ thereby increasing the output voltage $V_{out}$ and the output power $P_{out}$.

In other implementations, the EM sources 302 generate EM fields 304 that ionize only one of the first plasma 122*a* or the second plasma 122*b*. For example, the EM field 304 may travel in a propagation direction 306 that is parallel only to the conductive surface 112*b* of the collector 110*b*. Specifically, the EM fields 304 propagating in the propagation direction 306 parallel to the conductive surface 112*b* allow the EM fields 304 to absorb into the second plasma 122*b*, thereby increasing the temperature of the electrons 102 disposed within the second plasma 122*b*. Here, the micro-cavities 116*b* and channels 118 of the collector 110*b* provide holes and/or voids in which the EM fields 304 can penetrate and absorb into the plasma 122 122*b* disposed within the conductive surfaces 112*b*.

In these implementations, the EM sources 302 generate EM fields 304 in the propagation direction 306 that is parallel only to the conductive surface 112*b* of the collector 110*b*, such that the propagation direction 306 is transverse (e.g., not parallel) to the conductive surface 112*a* of the emitter 110*a*. The energy of the EM fields 304 travelling in the propagation direction 306 that is transverse to the conductive surface 112*a* of the emitter 110*a* is absorbed by the conductive surface 112*a* of the emitter 110*a*. Thus, the EM fields 304 are unable to penetrate the holes of the micro-cavities 116*a* and channels 118 of the emitter 110*a* in order to absorb into and ionize the first plasma 122*a*. Here, the EM fields 304 travelling in the propagation direction 306 parallel to the conductive surface 112*b* and transverse to the conductive surface 112*a* ionize only the second plasma 122*b* while the EM fields 304 are unable to ionize the first plasma 122*a*.

In some examples, the TEC system 300 uses a combination of charged particle ionization and EM field ionization. For example, the TEC system 300 may use EM field ionization to ionize the second plasma 122*b* disposed within the collector 110*b* and charged particle ionization to ionize the first plasma 122*a* disposed within the emitter 110*a*. In this example EM sources 302 generate EM fields 304 in a propagation direction parallel to the conductive surface 112*b* of the collector 110*b*. The EM fields 304 penetrate the micro-cavities 116*b* and channels 118 of the collector 110*b* absorbing into the second plasma 122*b* (e.g., EM field ionization), thus, ionizing and/or increasing the temperature of the second plasma 122*b*. Continuing with the example, the TEC system 300 ionizes the first plasma 122*a* using charged particle ionization. The TEC system 300 generates charged particles (e.g., fission fragments, alpha decay particles, and/or beta decay particles) from a nuclear reaction (e.g., fission and/or beta decay) that enter and ionize the first plasma 122*a*. Here, the charged particles ionize the first plasma 122*a* to mitigate the space charge effect and electrons emit from the emitter 110*a* to traverse the inter-electrode gap 120 to the collector 110*b*. Here, the first plasma 122*a* ionizes using charged particle ionization and the second plasma 122*b* ionizes using EM field ionization. In other examples, the TEC system 300 uses both EM field ionization and charged particle ionization to ionize the first and second plasma 122*a*, 122*b*. Any combination of EM field ionization and charged particle ionization may be used to ionize the first and second plasma 122*a*, 122*b*.

Figure 4:
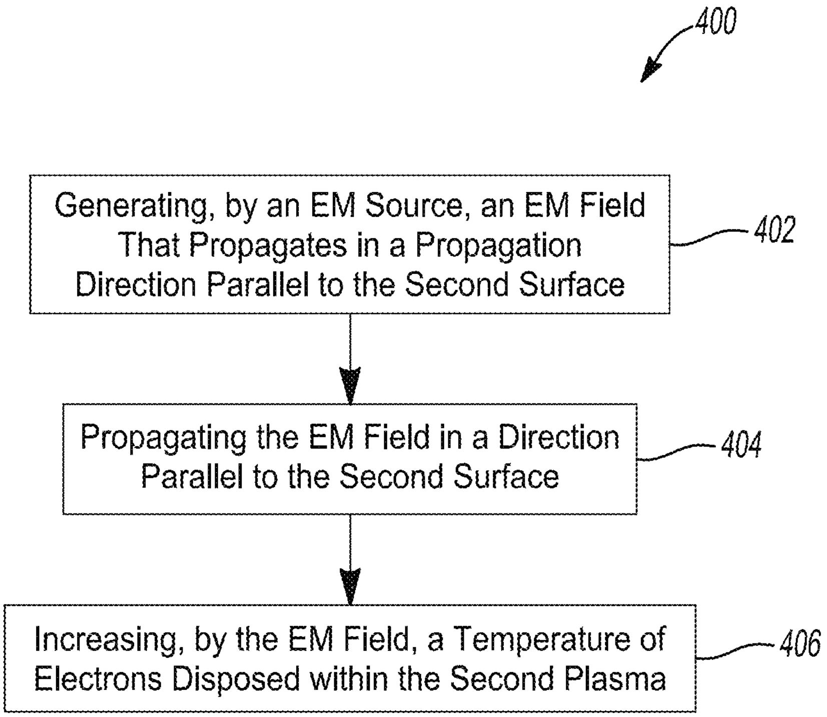
FIG. 4 is a flow diagram of a method of generating electricity with the structured plasma cell energy converter of FIG. 3B, according to the principles of the present disclosure.

With reference to FIG. 4, a method 400 of operating a structured plasma cell to produce electricity. The structured plasma cell includes a first electrode (e.g., emitter 110*a*) including a first surface 112*a* and a first plasma 122*a*. The first surface 112*a* defines a first micro-cavity 116*a* and the first plasma 122*a* is disposed within the first micro-cavity 116*a*. The structured plasma cell also include a second electrode (e.g., collector 110*b*) including a second surface 112*b* and a second plasma 122*b*. The second surface 112*b* defines a second micro-cavity 116*b* and the second plasma 122*b* is disposed within the second micro-cavity 116*b*. At step 402, the method 400 may include generating, by an EM source 302, an EM field 304. The EM field 304 may include any type of EM field such as a radiofrequency wave or a microwave. At step 404, the method 400 includes propagating the EM field 304 in a direction parallel to the second surface (e.g., conductive surface 112*b*). At step 406, the method 400 includes increasing, by the EM field 304, a temperature of the electrons 102 disposed within the second plasma 122*b*.

Each of the configurations described in the detailed description above may include any of the features, options, and possibilities set out in the present disclosure, including those under the other independent configurations, and may also include any combination of any of the features, options, and possibilities set out in the present disclosure and figures. Further examples consistent with the present teachings described herein are set out in the following numbered clauses:

Clause 1: A structured plasma cell comprising: a first electrode including a first plurality of micro-cavities; a first plasma disposed within one or more micro-cavities of the first plurality of micro-cavities; a second electrode including a second plurality of micro-cavities; and a second plasma disposed within one or more micro-cavities of the second plurality of micro-cavities; and an inter-electrode gap disposed between the first electrode and the second electrode.

Clause 2: The structured plasma cell of clause 1, further comprising a bulk plasma disposed within the inter-electrode gap.

Clause 3: The structured plasma cell of any of clauses 1 through 2, further comprising an insulator disposed within the inter-electrode gap.

Clause 4: The structured plasma cell of clause 3, wherein the insulator includes conductive paths configured to electrically connect one or more of the first plurality of micro-cavities with one or more of the second plurality of micro-cavities.

Clause 5: The structured plasma cell of clause 4, wherein plasma is disposed within the conductive paths of the insulator.

Clause 6: The structured plasma cell of any of clauses 1 through 5, wherein the first plurality of micro-cavities of the first electrode are disposed on a surface and a body of the first electrode.

Clause 7: The structured plasma cell of clause 6, wherein the first plurality of micro-cavities disposed on the surface of the first electrode are directly exposed to the inter-electrode gap.

Clause 8: The structured plasma cell of any of clauses 1 through 7, wherein a quantity of the first plurality of micro-cavities is less than a quantity of the second plurality of micro-cavities.

Clause 9: The structured plasma cell of any of clauses 1 through 8, wherein the first electrode comprises a first plurality of channels configured to electrically connect a first micro-cavity of the first plurality of micro-cavities with a second micro-cavity of the first plurality of micro-cavities.

Clause 10: The structured plasma cell of any of clauses 1 through 9, further comprising a heat source configured to heat the first electrode that emits electrons into the inter-electrode gap.

Clause 11: A method of operating a structured plasma cell to produce electricity, wherein the structured plasma cell comprises a first electrode including a first surface and a first plasma, the first surface defining a first micro-cavity and the first plasma disposed within the first micro-cavity and a second electrode including a second surface and a second plasma, the second surface defining a second micro-cavity and the second plasma disposed within the second micro-cavity, the method comprising: generating, by an electromagnetic (EM) source, an EM field; propagating the EM field in a direction parallel to the second surface; and increasing, by the EM field, a temperature of electrons disposed within the second plasma.

Clause 12: The method of clause 11, wherein the first surface includes a conductive material.

Clause 13: The method of any of clauses 11 through 12, further comprising absorbing the EM field into the second plasma.

Clause 14: The method of clause 13, further comprising: ionizing the first plasma using charged particles from a nuclear reaction; emitting electrons from the first surface of the first electrode into the first plasma disposed within the first micro-cavity; conducting the emitted electrons from the first micro-cavity through an inter-electrode gap to the second micro-cavity; and collecting emitted the electrons at the second surface of the second electrode.

Clause 15: The method of any of clauses 11 through 14, further comprises providing an insulator at an inter-electrode gap disposed between the first electrode and the second electrode.

Clause 16: The method of any of clauses 11 through 15, wherein the EM field comprises one of: a radiofrequency wave; or a microwave.

Clause 17: The method of any of clauses 11 through 16, wherein the first electrode includes a dielectric material.

Clause 18: The method of any of clauses 11 through 17, wherein the first electrode includes a first body that is concealed from the first plasma.

Clause 19: The method of any of clauses 11 through 18, wherein the increased temperature of the electrons in the second plasma increases an amount of electricity produced by the structured plasma cell.

Clause 20: The method of any of clauses 11 through 19, wherein the first electrode includes a plurality of first micro-cavities and the second electrode includes a plurality of second micro-cavities.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A system to produce electricity comprising:

a first electrode including a first surface defining a first micro-cavity configured to receive an ionized gas;

a second electrode including a second surface defining a second micro-cavity configured to receive the ionized gas; and an inter-electrode gap disposed between the first electrode and the second electrode.

2. The system of claim 1, further comprising a bulk plasma disposed within the inter-electrode gap.

3. The system of claim 2, further comprising an insulator disposed within the inter-electrode gap.

4. The system of claim 1, further comprising a conductive path disposed within the inter-electrode gap and configured to electrically connect the first micro-cavity with the second micro-cavity.

5. The system of claim 4, wherein the ionized gas is disposed within the conductive path.

6. The system of claim 1, wherein the first micro-cavity is directly exposed to the inter-electrode gap.

7. The system of claim 1, wherein the first micro-cavity and the second micro-cavity are directly exposed to the inter-electrode gap.

8. The system of claim 1, further comprising a heat source configured to heat the first electrode that emits electrons into the inter-electrode gap.

9. The system of claim 1, wherein the first surface includes a conductive material.

10. The system of claim 1, wherein the first electrode includes a dielectric material.

11. A method of operating a system to produce electricity, wherein the system comprises a first electrode including a first surface and an ionized gas, and a second electrode including a second surface and the ionized gas, the method comprising:

generating, by an electromagnetic (EM) source, an EM field;

propagating the EM field in a direction parallel to the second surface; and increasing, by the EM field, a temperature of electrons disposed within the ionized gas.

12. The method of claim 11, wherein:

the first surface defines a first micro-cavity receiving the ionized gas; and the second surface defines a second micro-cavity receiving the ionized gas.

13. The method of claim 11, further comprising absorbing the EM field into the ionized gas proximate the second surface.

14. The method of claim 13, further comprising:

ionizing the ionized gas using charged particles from a nuclear reaction;

emitting electrons from the first surface into the ionized gas;

conducting the emitted electrons from the ionized gas through an inter-electrode gap disposed between the first electrode and the second electrode; and collecting the emitted electrons at the second surface.

15. The method of claim 11, further comprising electrically isolating the first electrode from the second electrode with an insulator disposed between the first electrode and the second electrode.

16. The method of claim 11, wherein the EM field comprises one of:

a radiofrequency wave; or a microwave.

17. The method of claim 11, wherein the first electrode includes a dielectric material.

18. The method of claim 11, wherein the first electrode includes a first body that is concealed from the ionized gas.

19. The method of claim 11, wherein the increased temperature of the electrons in the ionized gas increases an amount of electricity produced by the system.

20. The method of claim 11, wherein the first electrode includes a plurality of first micro-cavities and the second electrode includes a plurality of second micro-cavities.

* * * * *